US011099621B2

(12) United States Patent
Ho et al.

(10) Patent No.: US 11,099,621 B2
(45) Date of Patent: Aug. 24, 2021

(54) REAL TIME CLOCK BATTERY POWER MANAGEMENT

(71) Applicant: Dell Products L.P., Round Rock, TX (US)

(72) Inventors: Szu Shao Ho, New Taipei (TW); Jui-Chin Fang, Taipei (TW); Chia Fa Chang, Taipei (TW); Chien-Hao Chiu, Taoyuan (TW); Chia Liang Lin, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 16/512,508

(22) Filed: Jul. 16, 2019

(65) Prior Publication Data
US 2021/0018970 A1 Jan. 21, 2021

(51) Int. Cl.
*G06F 1/30* (2006.01)
*G06F 1/18* (2006.01)
*H02H 1/00* (2006.01)
*H02J 7/00* (2006.01)
*H02H 7/18* (2006.01)
*G06F 1/14* (2006.01)

(52) U.S. Cl.
CPC ............... *G06F 1/30* (2013.01); *G06F 1/189* (2013.01); *H02H 1/0007* (2013.01); *H02H 7/18* (2013.01); *H02J 7/0026* (2013.01); *G06F 1/14* (2013.01)

(58) Field of Classification Search
None
See application file for complete search history.

(56) References Cited

U.S. PATENT DOCUMENTS

| 5,493,203 | A | * | 2/1996 | Dalton | G05F 1/445 323/282 |
| 5,542,077 | A | * | 7/1996 | Johnson | G06F 11/1417 713/300 |
| 6,266,786 | B1 | * | 7/2001 | Chang | G06F 1/305 713/340 |
| 7,733,117 | B1 | * | 6/2010 | Priel | G06F 21/86 326/8 |
| 2012/0007603 | A1 | * | 1/2012 | Zhang | H01M 10/4207 324/434 |
| 2012/0327749 | A1 | * | 12/2012 | Tsukamoto | G06F 1/3212 368/204 |

(Continued)

FOREIGN PATENT DOCUMENTS

| CN | 203311331 U | 11/2013 |
| CN | 103944206 A | 7/2014 |
| CN | 105590548 A | 5/2016 |

*Primary Examiner* — Danny Chan
(74) *Attorney, Agent, or Firm* — Zagorin Cave LLP; Robert W. Holland

(57) ABSTRACT

An information handling system real time clock (RTC)/CMOS circuit is powered from a battery that powers the information handling system. The battery power is supplied through a power management circuit that manages power constraints to the real time clock and that protects the battery from exceeding current and voltage thresholds. A protection integrated circuit selectively cuts off power supply from a power module to the RTC/CMOS circuit if predetermined conditions are detected. The protection circuit may also cutoff all power from battery with a permanent failure option or may itself directly supply power to the real time clock/CMOS circuit.

17 Claims, 3 Drawing Sheets

(56) References Cited

U.S. PATENT DOCUMENTS

| | | | |
|---|---|---|---|
| 2013/0288491 A1* | 10/2013 | Ziarnik | H01M 10/4257 439/51 |
| 2014/0042980 A1* | 2/2014 | Floros | H01M 10/441 320/134 |
| 2016/0378135 A1* | 12/2016 | Larson | G06F 9/4401 713/2 |

* cited by examiner

REAL TIME CLOCK BATTERY POWER MANAGEMENT

BACKGROUND OF THE INVENTION

Field of the Invention

The present invention relates in general to the field of information handling system power management, and more particularly to an information handling system real time clock battery power management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, information handling systems process information with central processing unit (CPU) that executes instructions stored in random access memory (RAM). The CPU and RAM typically couple to and communicate through a printed circuit board (PCB) typically called a motherboard. The motherboard also supports other processing components that coordinate operations of the system, such as a chipset that manages CPU clock speed and an embedded controller that manages system power. Typically, an embedded controller GPIO interfaces with a power button to accept a power on command from an end user so that the embedded controller interfaces a power source to power the CPU and RAM. Once power is applied, the embedded controller executes pre-boot instructions that initiate a bootstrap process to retrieve an operating system from persistent memory into RAM for execution on the CPU. Generally, bootstrap and basic system operations are managed by a Basic Input/Output System (BIOS). Power down of the information handling system is typically managed by the BIOS and embedded controller, which removes power from the CPU and RAM once shutdown operations are complete.

During the bootstrap process, the BIOS typically retrieves system information from a low power static RAM integrated circuit referred to as the CMOS. For instance, the CMOS includes a real time clock (RTC) that tracks time of day while the information handling system is powered down, such as by storing the clock in static RAM. In order to maintain the BIOS information during power down, conventional RTC/CMOS devices include a battery, often referred to as the CMOS or motherboard battery. As long as the CMOS battery retains BIOS information in the static RAM, the BIOS information will remain available during system boot. In desktop or other non-portable information handling systems, the CMOS battery is the only power source for running the RTC should the system external power be disconnected.

Portable information handling systems, such as laptops, convertible systems, and tablets, typically integrate a battery in the portable housing to power the processing components when external power is not available. The embedded controller typically manages access to battery power through a charger integrated circuit, which charges the battery when excess external power is available. The integrated battery is typically a lithium ion multicell battery that can operate the information handling system CPU for several hours without external power. In some portable information handling systems, the RTC and CMOS receive power from the integrated battery when the CPU is powered down. A difficulty with this approach is that the battery power to the RTC/CMOS typically bypasses power management systems on the motherboard by tapping directly into the battery cell side instead of the battery output side. If the battery has discharged to a low point, then unmanaged power draws by the RTC/CMOS from a battery cell can result in too deep of a draw at the battery to create an undervoltage and/or over temperature condition.

SUMMARY OF THE INVENTION

Therefore, a need has arisen for a system and method which provides real time clock battery power management.

In accordance with the present invention, a system and method are provided which substantially reduce the disadvantages and problems associated with previous methods and systems for battery power draw by an RTC/CMOS. A power module supplies power to a real time clock circuit by drawing power from a system battery and passing the power through a switch controlled by a protection integrated circuit. The protection integrated circuit monitors battery conditions to disconnect the power module from the real time clock circuit with the switch if predetermined battery conditions are detected.

More specifically, an information handling system processes information with processing components, such as a central processing unit (CPU) and random access memory (RAM), that operate with power supplied from a system battery, such as a lithium ion battery integrated into a portable housing and interfaced with a motherboard of the information handling system. A real time clock (RTC) circuit receives power from the system battery through an RTC power management circuit that interfaces with the system battery. A power module receives power from the system battery and provides the power to the RTC circuit through a switch controlled by a protection integrated circuit. The protection integrated circuit interfaces with the battery power, such as with voltage and current sensors disposed in series to ground after the power module, to monitor the battery conditions and disconnect the power module from the RTC circuit if predetermined conditions are detected. In one alternative embodiment, when the power module is disconnected, the protection integrated circuit may itself provide power to the RTC circuit. In another alternative embodiment, the protection integrated circuit controls a battery switch disposed between the power module and battery to completely disconnect the battery from the RTC circuit.

The present invention provides a number of important technical advantages. One example of an important technical advantage is that an information handling system RTC/CMOS receives power from an integrated system battery during system power down states with the battery power managed to avoid voltage, current and temperature constraint limits. An output switch between the RTC circuit and RTC power module is controlled by a protection integrated circuit, which monitors for overvoltage, overcurrent and over temperature states. Based upon detected conditions, power to the RTC circuit may be provided from the system battery with control of battery discharge adjusted according to the source. Monitoring of battery discharge conditions provides flexible protection settings adjustable by software so that RTC power availability has enhanced reliability without damaging the system battery.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system that powers a processor and memory with an integrated system battery supports operation of a real time clock with power from the system battery provided through a power management circuit. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
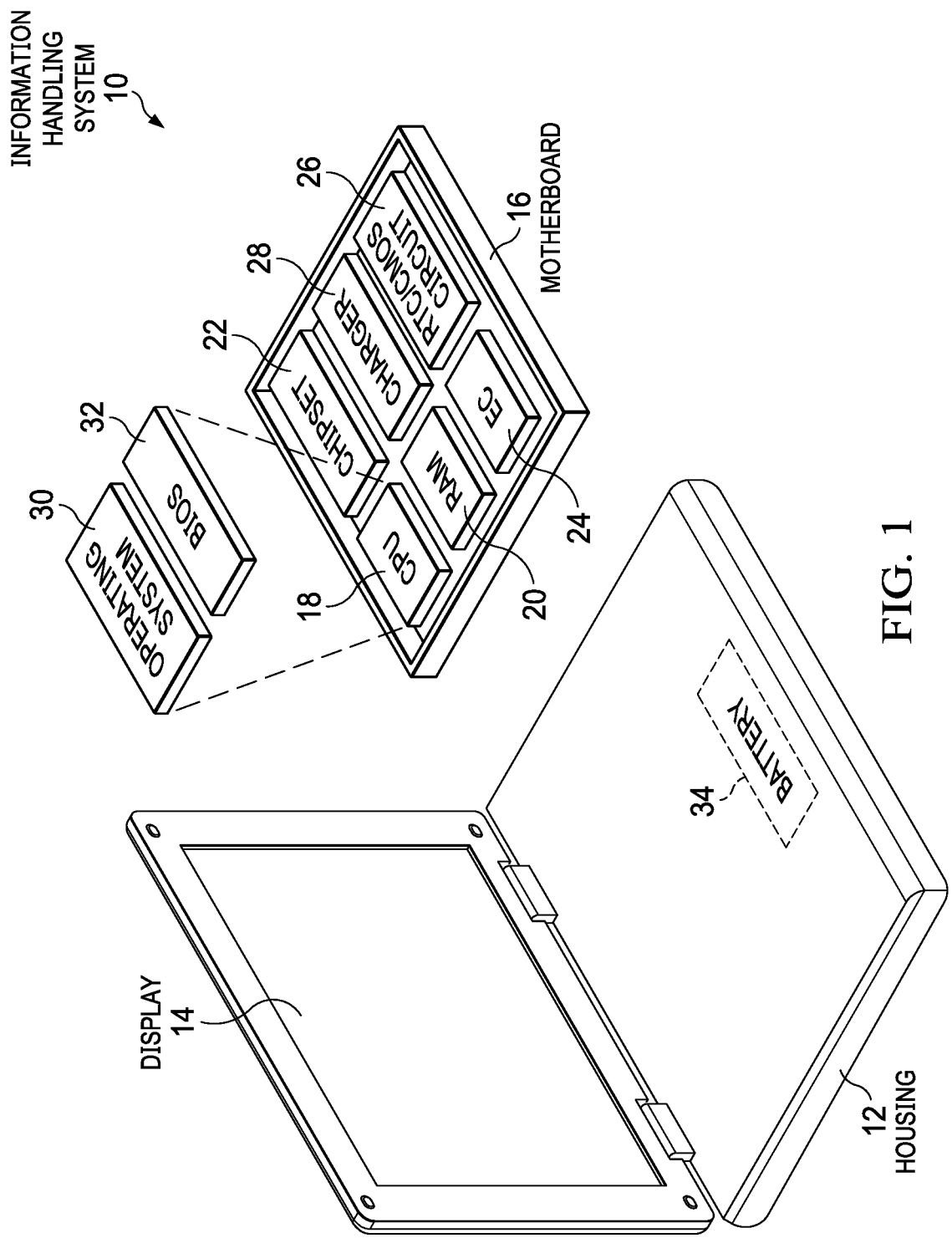
FIG. 1 depicts an exploded view of an information handling system having a real time clock (RTC)/CMOS circuit configured to draw power from a system battery.

Referring now to FIG. 1, an exploded view depicts an information handling system 10 having a real time clock (RTC)/CMOS circuit 26 configured to draw power from a system battery 34. In the example embodiment, information handling system 10 is built in a portable housing 12 that supports end user mobile use, such as with an integrated display 14 to present information as visual images. Information handling system 10 processes information with processing components disposed in the portable housing. For instance, a motherboard 16 couples into housing 12 to interface the processing components, such as with wirelines integrated into a printed circuit board. A central processing unit (CPU) 18 executes instructions stored in random access memory (RAM) 20 to process information, such as instructions of an operating system 30 and applications that run over the operating system. A chipset 22 interfaces with CPU 18 to manage clock speed, power consumption, memory access and graphics associated with CPU 18 operation. An embedded controller 24 manages application of power to the other processing components, such as by powering up and down power rails that supply power to the processing components. A real time clock (RTC)/CMOS circuit 26 tracks information that aids in operation of the processing components. RTC/CMOS 26 stores information during periods of power down of CPU for use by information handling system 10 upon transition to a power up state. A charger 28 interfaces with an external power source, such as an external AC/DC adapter, and with an integrated system battery 34 to provide power to the processing components and to charge/discharge battery 34.

During operation, information handling system 10 transitions from an off state of CPU 18 to an on state having operating system 30 executing by applying power with embedded controller 24 to CPU 18. Once power is available, pre-boot code executes on embedded controller 24 to retrieve and execute a Basic Input/Output System (BIOS) 32 that coordinates interactions of hardware and firmware components. BIOS 32, in turn, retrieves and executes operating system 30 to support execution of applications over the hardware and firmware components. During transition from the off state to the operational state, BIOS 32 retrieves information stored in RTC/CMOS circuit 26 to use in populating system state information, such as the time of day. RTC/CMOS circuit 26 stores the data in static RAM and keeps the data fresh and available for boot by interfacing with power provided from system battery 34. When RTC/CMOS circuit 26 shares the system battery 34 used for general system power, the state of system battery 34 at power down to the off state may change significantly between power down states depending upon how much battery charge and discharge takes place. Conventional RTC/CMOS circuits 26 powered by a separate function-specific battery on motherboard 16 would have a less diverse and more predictable battery charge state upon power down since the dedicated "motherboard" battery only supported the RTC/CMOS circuit. Sharing system battery 34 to also power RTC/CMOS circuit 26 offers greater battery reserve in most cases, however, the unpredictable state of battery charge can present a risk that the RTC/CMOS circuit 26 will draw power outside of the system battery 34 limitations.

Figure 2:
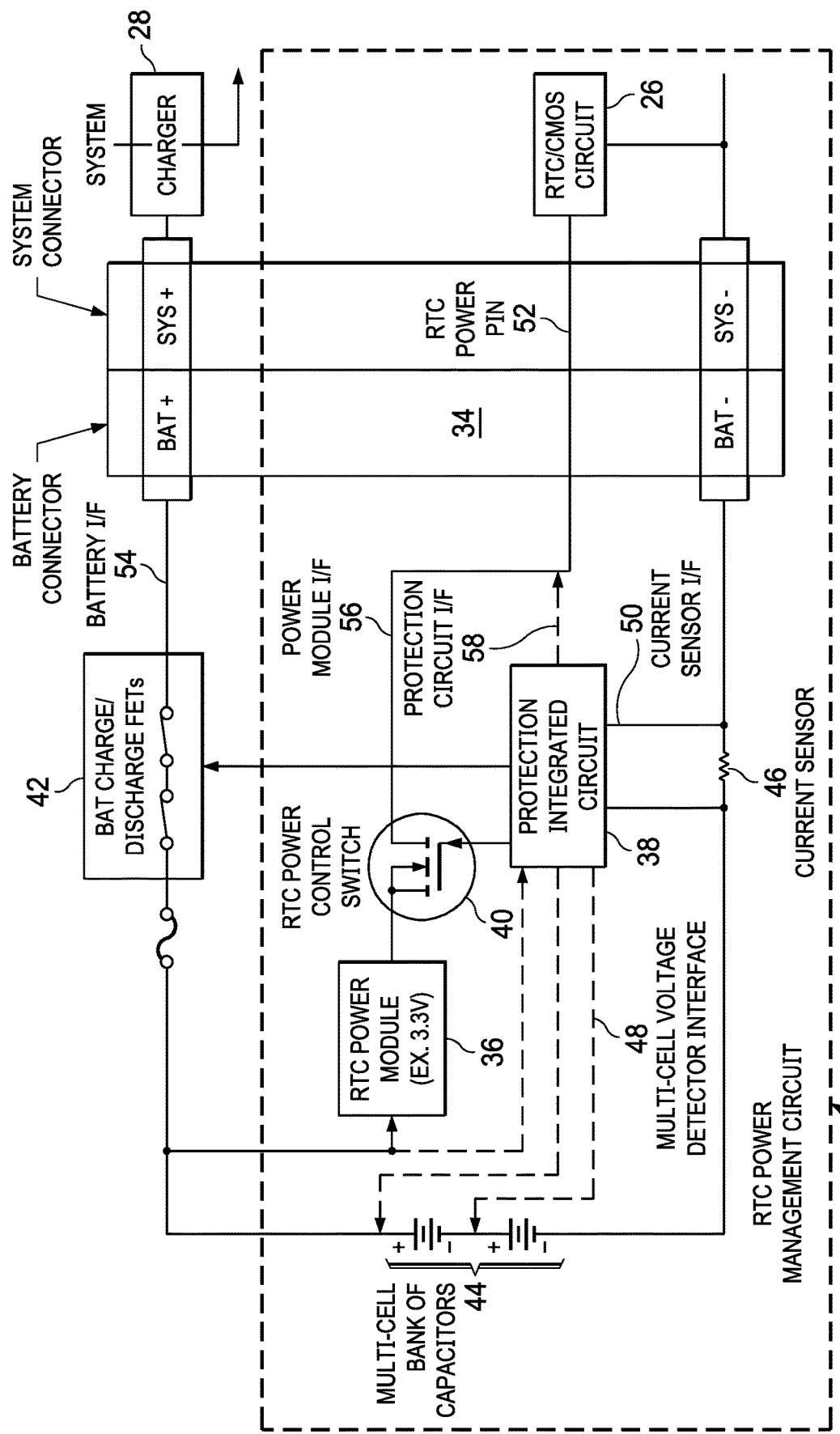
FIG. 2 depicts a circuit block diagram of a real time clock power management circuit.

Referring now to FIG. 2, a circuit block diagram depicts a real time clock power management circuit 60. RTC/CMOS circuit 26 interfaces with battery 34 on a battery cell side at which power transfer passes to a battery interface 54 that is independent and separate from system side battery management provided by charger 28. RTC power management circuit 60 manages power transfer from battery 34 to RTC/CMOS circuit 26 so that battery 34 maintains minimum voltage, current and temperature constraints. An RTC power module 36 receives power from battery interface 54 and manages the battery power to supply RTC/CMOS circuit 34 at an RTC power pin 52 within defined power constraints. For instance, RTC power module 36 is an integrated circuit with a low dropout (LDO) power supply that accepts external power of 3.3V or greater from a cell of battery 34 and adapts the power to supply RTC/CMOS circuit 26 at a minimum voltage. In one embodiment, RTC power module 36 may have a first embedded code model that executes to provide power from adequate external voltage supply, such as a minimum of 3.3V, and a second embedded code model that executes for an overvoltage protection. The embedded code model selected to execute on RTC power module 36 may vary based upon the voltage received at RTC power module 34 or as commanded by other power sensing devices, as described below. In a typical system battery 34, multiple battery cells are connected in series to provide a higher voltage output. Since RTC/CMOS circuit 26 is a low power consumption circuit designed to minimize power consumption over lengthy off power states, battery interface 54 may connect with a single cell of the multi-cell battery 34.

A protection integrated circuit 38 interfaces with battery 34 to provide battery gauge and protection functions to ensure that battery 34 stays within defined operating constraints. If protection integrated circuit 38 detects a condition that falls outside of defined battery constraints, a command interface with a power control switch 40 allows protection integrated circuit 38 to shut off power draw from battery 34 by RTC power module 36. The opening of switch 40 to shut off power can produce a temporary failure of RTC/CMOS circuit 26 by freezing static RAM values and ceasing clock operation; however, if battery 34 conditions change, such as by charging with external power or settling of charge state over time, protection integrated circuit 38 may close switch 40 to return power to RTC/CMOS circuit 26. Further, protection integrated circuit 38 may directly power RTC/CMOS circuit 26 through a protection circuit interface 58 when power is not available from RTC power module 36, such as when switch 40 is open. If power conditions of battery 34 fall too far outside of defined constraints, protection integrated circuit 38 may instead open battery charge/discharge switch 42, such as one or more field effect transistors (FET), that cuts off power to RTC power management circuit 60, which results in a permanent failure since protection integrated circuit 38 will not have power to re-open battery switch 42. In addition, a fuse may be included as an additional hard fault safety device.

In the example embodiment, protection integrated circuit 38 monitors the battery state with voltage, current and temperature sensing. A multi-cell bank of capacitors 44 are disposed in series along battery interface 54 after power interfaces to RTC power module 36. Protection circuit 38 interfaces a pin at the start of multi-cell bank of capacitors 44 and a second pin at a middle position of multi-cell bank of capacitors 54 with a multi-cell voltage detector interface 48 to detect voltage at battery 34. A current sensor 46 is disposed in series with multi-cell bank 44 before the ground of battery 34 to sense current at battery 34. For instance, current sensor 46 is a resistor that protection integrated circuit 38 interfaces with through a current sensor interface 50 coupled on opposing sides to measure voltage drop, which indicates current draw at ground. In the example embodiment, protection circuit 38 integrates a temperature sensor that detects temperature through the battery wireline. In an example embodiment, protection integrated circuit 38 opens switch 40 if battery voltage measures 3.0V over a delay period of one second. Protection integrated circuit 38 provides power directly to RTC/CMOS circuit 26 until voltage drops to 2.8V and then recovers to again apply power once the battery reaches 3.0V. Overcurrent protection is applied if current draw exceeds 150 mA for five seconds and temperature protection is applied if 60 degrees Celsius is exceeded for one second. These constraints may vary based upon system and battery constraints. Further, upon detection of a threshold that results in switch 40 being opened, if the threshold continues to be exceeded, protection integrated circuit 38 may open battery switch 42.

Figure 3:
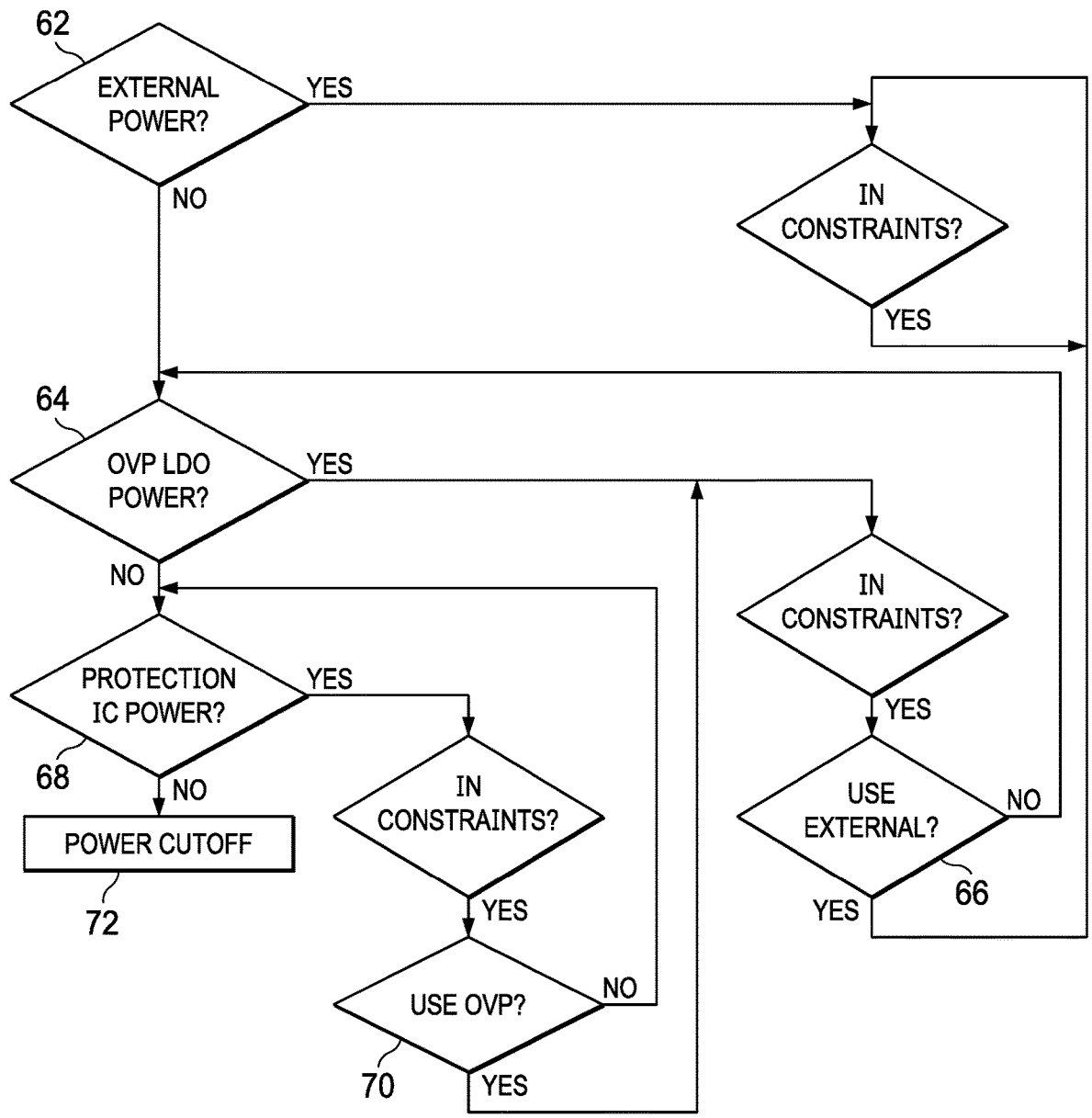
FIG. 3 depicts a state diagram of state transitions related to power management for providing power from a system battery to a real time clock circuit.

Referring now to FIG. 3, a state diagram depicts state transitions related to power management for providing power from a system battery to a real time clock circuit. In an initial external power state 62, the system battery has sufficient battery charge to maintain 3.3V or greater at the RTC power management circuit power module so that a primary model provides power to RTC/CMOS integrated circuit 26 with an LDO power supply. While battery conditions remain in the external power mode, power supply continues at state 62. If the battery conditions change to a lower power state, such as less than 3.0V, an overvoltage protection (OVP) power state 64 is entered that executes a secondary model on the RTC power module. The RTC power module remains in the secondary model mode while the battery conditions stay in the defined constraints; however, at state 66 a determination is made of whether to transition back to external power mode 62, such as due to a battery voltage increase above 3.3V. If in state 64 battery conditions fall below the constraints of the OVP LDO power state, the RTC power management circuit transitions to a protection integrated circuit power state 68 at which power is supplied to the RTC/CMOS circuit 26 by the protection integrated circuit. In one example embodiment, the protection integrated circuit power state 68 transitions at state 70 to the OVP LDO power state 64 if voltage exceeds 3.0V. If voltage drops below 2.8V, the RTC power management circuit 60 transitions to a power cutoff state 72. The power cutoff state 72 may be permanent, such as if the detected voltage indicates a battery failure, or temporary, such as if the battery conditions indicate that the battery will recover. Although the states depicted by FIG. 3 address detected voltage values, in alternative embodiments detected current and temperature may also be used.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions that process information;
   a memory operable to store the instructions and information;
   a power supply operable to provide power to the processor and memory;
   a motherboard coupled to the processor, memory and power supply, the motherboard integrating wirelines that interface the processor, memory and power supply;
   a battery interfaced with the motherboard to provide power to the power supply;
   a real time clock circuit coupled to the motherboard and interfaced with the battery through power module and a switch, the power module managing power constraints for power provided to the real time clock circuit;

a protection integrated circuit interfaced with the battery and the switch to selectively connect and disconnect the real time clock from the battery with the switch if one or more predetermined conditions are detected; and a direct interface between the protection integrated circuit and the real time clock circuit;

wherein the protection integrated circuit is operable to open the switch to disconnect the real time clock circuit from the battery and to directly provide power to the real time clock circuit from the battery;

wherein the protection integrated circuit provides a permanent failure option that opens a battery switch to cut off all power from the battery based on power conditions of the battery, and the protection integrated circuit cannot re-open the battery switch.

2. The information handling system of claim 1 further comprising:

the battery switch disposed between the battery and the power module;

wherein the protection integrated circuit interfaces with the battery switch to selectively connect and disconnect the battery and power module if one or more predetermined conditions are detected.

3. The information handling system of claim 1 further comprising:

a first control module stored in the power module and configured to control power supply to the real time clock circuit for a first predetermined condition; and a second control module stored in the power module and configured to control power supply to the real time clock circuit for a second predetermined condition.

4. The information handling system of claim 3 wherein the first predetermined condition comprises a first voltage provided from the battery and the second predetermined condition comprises a second voltage provided from the battery.

5. The information handling system of claim 1 further comprising:

a multi-cell bank of capacitors disposed in series on the interface from the battery to ground, the multi-cell bank of capacitors interfaced with the protection integrated circuit to detect battery voltage; and a current sensor disposed on the interface from the battery to ground, the current sensor interfaced with the protection integrated circuit to detect battery current.

6. The information handling system of claim 5 wherein the battery comprises a multi-cell battery and the real time clock circuit interfaces with only one cell of the multi-cell battery.

7. The information handling system of claim 5 wherein the protection integrated circuit integrates a temperature sensor and applies a sensed temperature as one of the one or more predetermined conditions.

8. The information handling system of claim 5 further comprising:

a portable housing that contains the motherboard; and a charger integrated circuit coupled to the motherboard and operable to receive external power and apply the external power to charge the battery.

9. A method for powering a real time clock in an information handling system powered by a battery, the method comprising:

interfacing the real time clock with the battery through a power module and switch;

interfacing a protection integrated circuit with the switch and the battery;

monitoring the battery with the protection integrated circuit to detect plural predetermined conditions;

in response to one or more of the plural predetermined conditions, activating the switch with the protection integrated circuit to disconnect the power module from the real time clock; and in response to the activating the switch with the protection integrated circuit to disconnect the power module from the real time clock, communicating power directly from the protection circuit to the real time clock;

wherein the protection integrated circuit provides a permanent failure option that opens a battery switch to cut off all power from the battery based on power conditions of the battery, and the protection integrated circuit cannot re-open the battery switch.

10. The method of claim 9 further comprising:

interfacing the battery switch between the power module and the battery;

interfacing the protection integrated circuit with the battery switch; and in response to one or more of the plural predetermined conditions, activating the battery switch to disconnect the battery from the power module.

11. The method of claim 9 further comprising:

interfacing a multi-cell bank of capacitors between the power module battery interface and ground;

interfacing a current sensor between the power module battery interface and ground;

interfacing the protection integrated circuit with the multi-cell bank of capacitors and the current sensor; and detecting the plural predetermined conditions at least in part with voltage sensed by the multi-cell bank of capacitors.

12. The method of claim 11 further comprising:

monitoring temperature with the protection integrated circuit; and detecting the plural predetermined conditions at least in part with the monitored temperature.

13. The method of claim 9 further comprising:

storing first and second control models on the power module; and selecting one of the first and second control models to power the real time clock based upon one or more of the plural predetermined conditions.

14. The method of claim 9 wherein:

the battery comprises multiple battery cells; and the interfacing the real time clock with the battery through a power module and switch further comprises interfacing the real time clock with only one cell of the multiple battery cells.

15. A real time clock power management circuit comprising:

a power module having a power input interfaced with a battery, a power output interfaced with a real time clock and a low dropout power supply operable to power the real time clock;

a protection integrated circuit operable to monitor voltage and current associated with power supplied to the power module power input; and a switch disposed between the power module output and real time clock, the switch interfaced with the protection integrated circuit;

wherein the protection integrated circuit selectively opens the switch to disconnect the power module from the real time clock if the voltage and current have a first predetermined condition; and wherein the protection integrated circuit is further operable to provide power directly to the real time clock when the power module is disconnected from providing power to the real time clock;

wherein the protection integrated circuit provides a permanent failure option that opens a battery switch to cut off all power from the battery based on power conditions of the battery, and the protection integrated circuit cannot re-open the battery switch.

16. The real time clock power management circuit of claim 15 further comprising:

the battery switch disposed between the power module and the battery, the battery switch interfaced with the protection integrated circuit;

wherein the protection integrated circuit opens the battery switch to disconnect the power module from the battery if the voltage and current have a second predetermined condition.

17. The real time clock power management circuit of claim 15 further comprising:

first and second power supply models stored on the power module, the power module operable to select the first or second power supply model to provide power to the real time clock based on a third predetermined condition.

* * * * *